US008984421B2

(12) United States Patent
Canal et al.

(10) Patent No.: US 8,984,421 B2
(45) Date of Patent: Mar. 17, 2015

(54) AIRCRAFT CREW USER INTERFACE FOR AN AIRCRAFT ENTERTAINMENT SYSTEM

(75) Inventors: Eric Canal, Toulouse (FR); Carla Ree Arnold, Lake Forest, CA (US); Pennie Walley, Ladera Ranch, CA (US)

(73) Assignee: Thales Avionics, Inc., Irvine, CA (US)

( * ) Notice: Subject to any disclaimer, the term of this patent is extended or adjusted under 35 U.S.C. 154(b) by 505 days.

(21) Appl. No.: 12/496,128

(22) Filed: Jul. 1, 2009

(65) Prior Publication Data

US 2011/0004832 A1 Jan. 6, 2011

(51) Int. Cl.
*G06F 3/00* (2006.01)
*G06Q 30/06* (2012.01)

(52) U.S. Cl.
CPC .................................. *G06Q 30/06* (2013.01)
USPC ....................................................... 715/758

(58) Field of Classification Search
USPC .......................... 715/792, 771, 800, 815, 793
See application file for complete search history.

(56) References Cited

U.S. PATENT DOCUMENTS

| | | | |
|---|---|---|---|
| D412,157 S | 7/1999 | Stevenson | |
| D495,981 S | 9/2004 | Tölle et al. | |
| 6,813,777 B1 * | 11/2004 | Weinberger et al. | 725/76 |
| 6,867,711 B1 | 3/2005 | Langner et al. | |
| D506,715 S | 6/2005 | Magnussen | |
| 7,030,892 B1 * | 4/2006 | Gyde et al. | 345/635 |
| D526,611 S | 8/2006 | Langner et al. | |
| D540,230 S | 4/2007 | Hoelzel et al. | |
| D556,107 S | 11/2007 | Figueiredo | |
| 7,295,135 B2 | 11/2007 | Younkin | |
| D557,645 S | 12/2007 | Akagawa et al. | |
| 7,307,549 B2 | 12/2007 | Firra | |
| D561,083 S | 2/2008 | Langner et al. | |
| D589,421 S | 3/2009 | Tupinier | |
| D592,126 S | 5/2009 | da Silveira et al. | |
| 2002/0082879 A1 * | 6/2002 | Miller et al. | 705/5 |
| 2003/0058112 A1 * | 3/2003 | Gleine | 340/573.1 |
| 2005/0240774 A1 * | 10/2005 | Angus et al. | 713/182 |
| 2006/0106682 A1 * | 5/2006 | Van Dyck et al. | 705/27 |
| 2007/0276706 A1 * | 11/2007 | Dunsky | 705/5 |
| 2008/0295090 A1 * | 11/2008 | Bestle et al. | 717/170 |
| 2010/0187080 A1 * | 7/2010 | Lamoree et al. | 200/5 A |
| 2010/0256838 A1 * | 10/2010 | Stecko et al. | 701/3 |
| 2010/0318387 A1 * | 12/2010 | Kishore et al. | 705/5 |
| 2011/0068227 A1 * | 3/2011 | Kneller et al. | 244/118.6 |

* cited by examiner

*Primary Examiner* — William Bashore
*Assistant Examiner* — Rayeez Chowdhury
(74) *Attorney, Agent, or Firm* — Myers Bigel Sibley & Sajovec

(57) ABSTRACT

Provided is a system and method for displaying a graphic on a crew user interface. The system comprises a crew user interface comprising an input and an output, a server accessed by the crew user interface comprising a display application program that retrieves screen configuration data stored in a non-volatile memory of a database connected to the server and an aircraft entertainment system connected to the crew user interface. The output comprises the graphic that is produced during run-time by the application program interpreting the screen configuration data.

28 Claims, 13 Drawing Sheets

US 8,984,421 B2

AIRCRAFT CREW USER INTERFACE FOR AN AIRCRAFT ENTERTAINMENT SYSTEM

BACKGROUND

This invention pertains generally to aircraft entertainment and passenger service systems. More particularly, the present invention relates to an aircraft crew user interface for an entertainment system.

Commercial passenger airlines and transportation vehicles continuously try to make travel as enjoyable as possible for their customers. Airlines often provide in-flight entertainment systems that provide access to various entertainment and services for passengers on the aircraft.

It is desirable for the crew and maintenance personnel to be able to centrally control and monitor the provision of and availability of services to passengers on the aircraft, in portions of the aircraft or in particular seats on the aircraft. In addition, new services may be added or existing services may need to be modified from time to time. It is desirable to be able to modify the availability of services, the types of services, and the display of information provided to the crew and maintenance personnel about those services. Therefore, it would be beneficial to be able to adapt the control logic for the display of such information and the navigation among menu screens without requiring changes in executable code.

SUMMARY

In one aspect of the invention a system is provided for displaying a graphic on a crew user interface. The system comprises a crew user interface comprising an input and an output, a server accessed by the crew user interface comprising a display application program that retrieves screen configuration data stored in a non-volatile memory of a database connected to the server and an aircraft entertainment system connected to the crew user interface. The output comprises the graphic that is produced during run-time by the application program interpreting the screen configuration data.

In another aspect a method for displaying a graphic on a crew user interface is provided. The method comprises accessing by the crew user interface a server to retrieve screen configuration data stored in a non-volatile memory of a database connected to the server and displaying the graphic on the display according to the screen configuration data retrieved from the non volatile memory. The graphic is controlled by the screen configuration data. The advantages of the invention will be apparent from the description of the various embodiments of the invention provided herein.

BRIEF DESCRIPTION OF THE DRAWINGS

The advantages of the invention will be apparent from the description of the various embodiments of the invention provided herein with reference to the attached drawings in which.

DETAILED DESCRIPTION OF THE EMBODIMENTS

Figure 1:
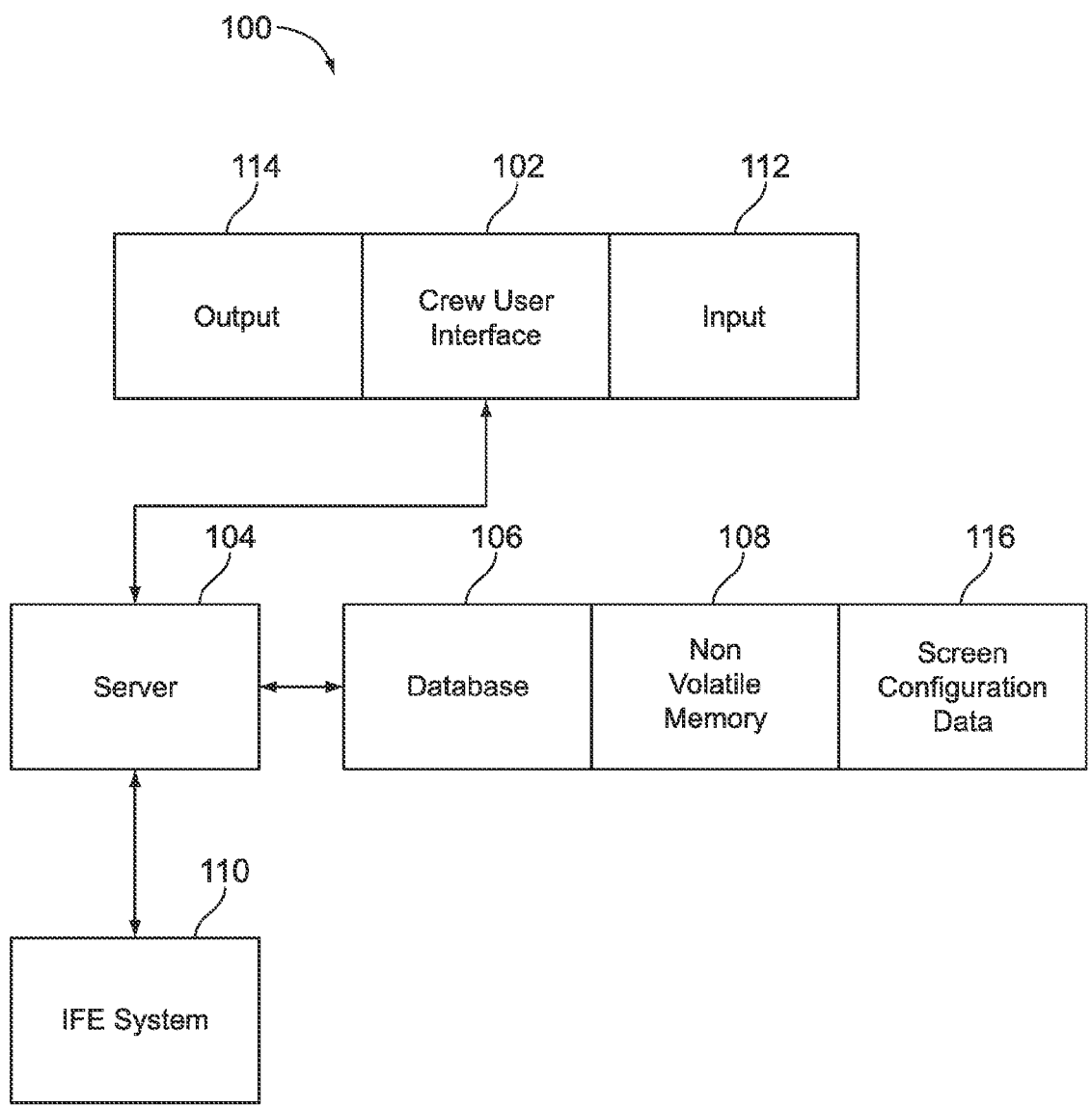
FIG. 1 is a block diagram of an embodiment of an aircraft entertainment system utilizing a crew user interface.

Turning now to the Figures, a system and method are provided for displaying a graphic on a crew user interface and for controlling services provided on a transportation vehicle such as an airline. FIG. 1 illustrates an embodiment of such a system. As shown in FIG. 1, the system 100 includes a crew user interface 102, a server 104, a database 106 in non volatile memory 108, and an In-flight Entertainment (IFE) System 110 having an aircraft passenger user interface.

The crew user interface 102 includes an user input 112 and a user output 114. The input 112 to the crew user interface 102 may be a touch screen device, a mouse, keyboard or any other appropriate input device for an user interface. The output 114 to the crew user interface 102 may be a LCD display with a touch screen, printer or any other appropriate device display capable of displaying information to a user.

The crew user interface 102 is in communication with the server 104 and implements the visual display of data and graphical elements to the user. The server 104 is connected to a database 106 of relational data tables designed to represent the configurable parameters of the crew user interface's 102 display of data and graphical elements. Such configuration data, referred to herein as screen configuration data 116, is stored in the database 106. For the purposes of this invention, the term "configuration data" or "screen configuration data" will include any form of data element, file, database field, record or table, XML document, or any data structure whose values can be changed and reinterpreted without recompilation of source code. The database 106 also maintains transactional records of all events and state changes in the IFE System 110.

In operation, the server 104 is accessed by the crew user interface 102 when running a display application program and retrieves the screen configuration data 116 stored in the database 106. The screen configuration data 116 controls the configuration of the visual display on the crew user interface 102 and the data that drives the operation of the crew user interface 102. Callable services are used to satisfy user data requests, issue system control directives entered via the crew user interface 102, perform user authentication and error processing, and receive notifications of IFE System 110 state updates.

The screen configuration data 116 may include data structures supporting the capability to display graphical elements at specific physical locations, in particular sizes, shapes, colors, proportions and languages on the output 114 of the crew user interface 102, as defined in the screen configuration data 116 rather than in executable code. The screen configuration data 116 may also include data structures supporting the capability to display on-screen graphical elements accessed from stored image files such that the images can be updated and re-referenced without a change to the application code. In one embodiment, the formats of the image files may include the Graphics Interchange Format (.gif), the Portable Network Graphics (.png) format, and the Joint Photographic Experts Group (.jpeg) format, although any well-known image format may be utilized.

The screen configuration data 116 may also comprise data structures supporting the capability of the server 104 to adapt the control logic based on attributes in the screen configuration data 116 rather than in executable code for the following the display of user information messages and the navigation among crew user interface 102 menu screens. The screen configuration data 116 may provide data structures capable of buffering multiple user directives for execution, such that completion of one directive is not required prior to the user's ability to enter the next directive into the input 112 of the crew user interface 102. The data structures may buffer multiple directives to the system interface between the server 104 and the IFE System 110 for execution, such that completion of one directive is not required prior to generation of the next directive. The data structures provided are also capable of buffering multiple events for presentation on the output 114 of the crew user interface 102 such that display of one event is not required prior to generation and receipt of the next event and are capable of buffering multiple IFE System 110 events for processing by the server 104 such that completing the processing of one event is not required prior to generation and receipt of the next event.

The crew user interface 102 may operate in three basic modes: idle, service and maintenance. The idle mode comprises the operations of system initialization, selection of entertainment or maintenance functionality from a welcome screen, and user authentication via a screen requiring a password. In an embodiment, multiple levels of passwords may be customized for crew members/users. For example, in an embodiment a password may be set up that allows users to view status information but does not allow users to take any action (provide services etc.), another password may be set up that allows users to both view and take action on certain screens configured for this level of access, and yet another password may be set up that allows users to not only view and take actions on the screens but also to modify the screen configuration data 116. The service mode may comprise operations such as entertainment services, cabin services, passenger services, crew services, system control services, and additional features for session and security management (logout, screen saver, etc.). Access to certain service mode functionality may also be controlled through password protection. An embodiment may have a password set up to control access to sensitive data during offloading of data (as discussed herein). The maintenance mode comprises maintenance service functions. An embodiment may have different levels of access provided by various maintenance passwords. For example, a maintenance password may be utilized that allows a user to have access to all of the maintenance screens and another password may be set up for those users that need to be able to override functionality of the system for troubleshooting purposes.

Figure 2:
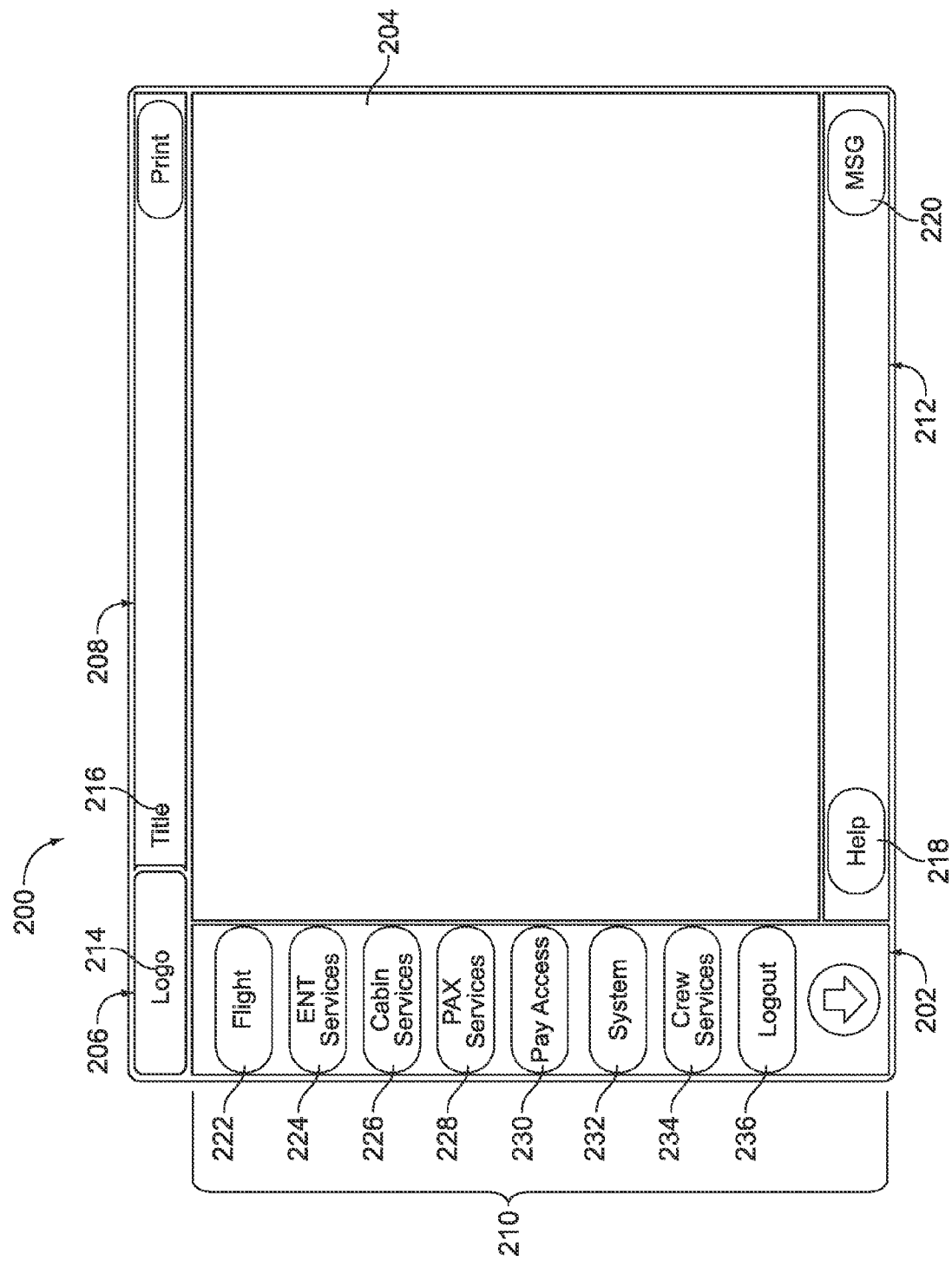
FIG. 2 is an exemplary screen shot according to one embodiment of a graphic on the crew user interface for the system of FIG. 1.

As illustrated in FIG. 2, the crew user interface 102 displays a graphic 200 according to the screen configuration data 116 retrieved from the non-volatile memory 108. The display of the graphic 200 is controlled by the screen configuration data 116. The graphic 200 is produced during run-time by the application program interpreting the screen configuration data 116. As illustrated in the embodiment shown in FIG. 2, the graphic comprises a frame 202 and a function area 204. A plurality of graphical elements are displayed in the frame 202 and in the function area 204. As discussed previously, the screen configuration data 116 specifies the location in which each graphical element is displayed and specifies the size, shape and color of each graphical element. Thus, the visual effect of colors, shapes, labels and other graphical elements may be changed without having to recompile the code. In the preferred embodiment, the size and shape of each graphical element may be based on millimeters/inches to ensure that, regardless of output screen resolution, graphical elements used for input, such as buttons etc., will fit a desired range of finger size. In other embodiments, pixel size could be used in the definition of a graphical element's size and/or shape. The behavior of a button or other input graphical element, e.g. selectable, unselectable, active, pressed etc. may be identified by its shape (e.g. round, square, oval, etc.), color and location on the page. Data for the frame 202 is maintained separately from data for the function area 204. In an embodiment, the graphic 200 produced on the crew user interface 102 contains a menu in a menu hierarchy. The screen configuration data 116 comprises data specifying the menu hierarchy/structure and the format of each menu and the services available on each menu. Thus, the functionality available through the crew user interface 102 may be changed without having to recompile the code.

In a preferred embodiment, the frame 202 of each graphic 200 is comprised of the following: a logo area 206, a header area 208, a navigation area 210 and a footer area 212. The logo area 206 comprises a logo graphical element 214, the header area 208 comprises a title graphical element 216, the navigation area 210 comprises one or more navigation graphical elements 222-236, and the footer area 212 may comprise a help graphical element 218 and a message graphical element 220 that displays status information reflecting status applicable to the crew user interface 102, the IFE System 110 or the function currently selected on the crew user interface 102.

In a preferred embodiment, the navigation graphical elements are categories for user selection, under which secondary associated functions are located. For example, in the embodiment shown in FIG. 2 the navigation area includes, but is not limited to, the following navigation elements in the shape of buttons: Flight 222, Entertainment Services 224, Cabin Services 226, Passenger Services 228, Pay Access 230, System 232, Crew Services 234 and Logout 236. The graphical elements 222-236 provide menu selections that may be selected by a user of the crew user interface 102. In FIG. 2 each of these elements 222-236 are shown as a button, although such elements are not limited to any particular shape.

As will be more fully described later, the function area 204 may be selectively activated through the input 112 to the crew user interface 102 and causes a service to be delivered by the IFE System 110 to a seat, a section of the aircraft or to the entire aircraft or a status to be viewed for a seat, a section of the aircraft or for the entire aircraft.

For certain functionality, it is desirable to allow a user of the crew user interface 102 to select an area of the aircraft for which services may be provided or for which to status may be displayed. A Layout of Passenger Accommodations (LOPA) graphical element is used on a variety of screens to allow the user to select an area to work on and/or to display status in that area. The LOPA graphical element is displayed in the function area 204 and represents the entire aircraft or a section of the layout of the aircraft.

Figure 3:
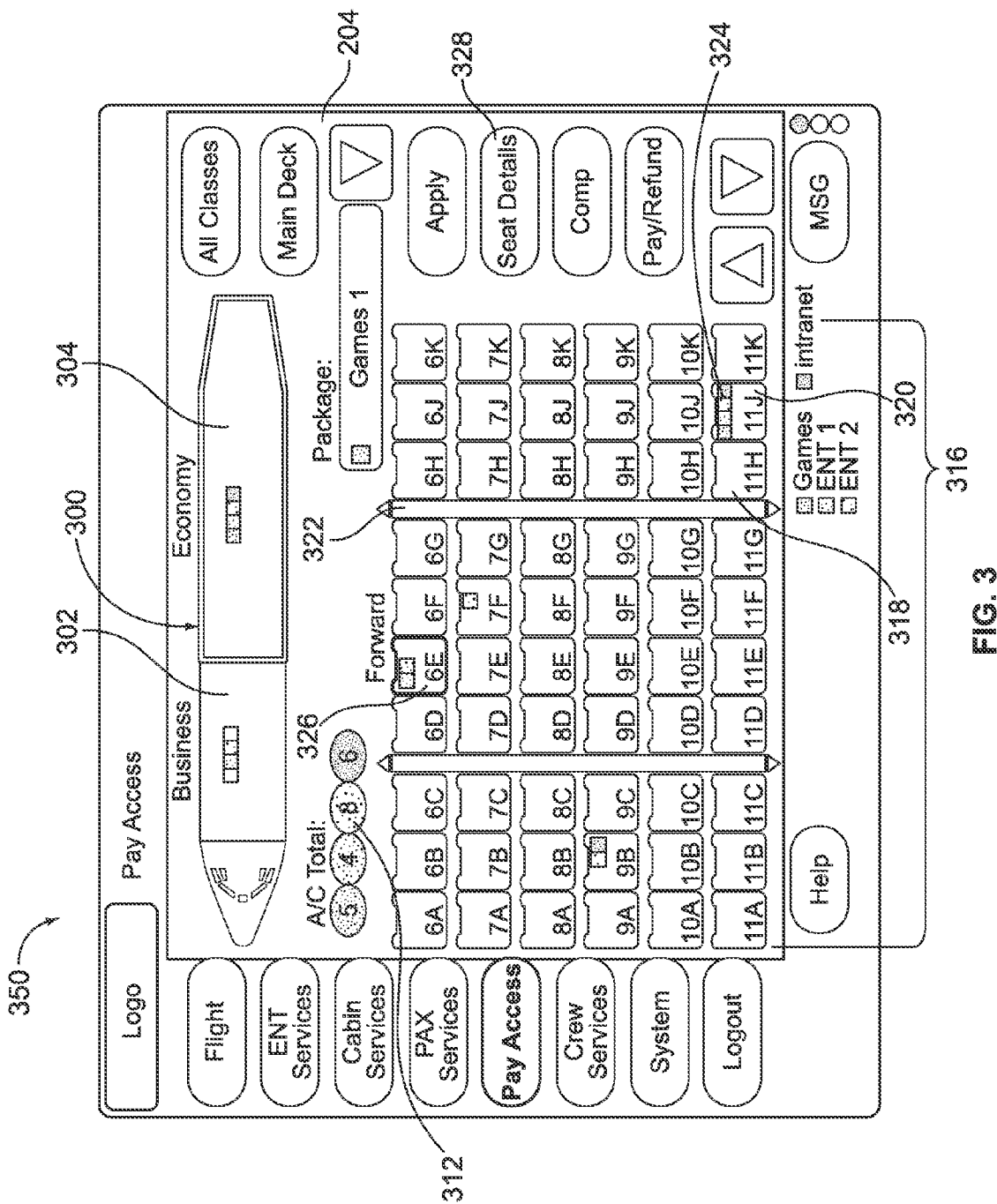
FIG. 3 is an exemplary screen shot according to an embodiment of a graphic on the crew user interface.

One example of a screen that may use the LOPA graphical element 300 is shown in FIG. 3, which is an exemplary display of a pay access screen 350, which may be displayed in response to the user selecting the pay access 230 control element. In this exemplary embodiment, the LOPA graphical element 300 is shaped like the cabin of the aircraft, although the LOPA graphical element 300 is not limited to a particular shape.

On the LOPA graphical element, the cabin of the aircraft may be divided into a plurality of sections or defined areas. For example, the cabin may be divided into sections such as business class and economy class. In the embodiment shown in FIG. 3, the LOPA graphical element 300 is divided up into two sections, "Business" 302 and "Economy" 304. In another embodiment, the LOPA may be divided up into three sections. In yet another embodiment the cabin may be divided up into six sections represented by the LOPA graphical element. Typically, the defined areas or sections are the different classes (first class, business, economy, coach) and/or rooms of the aircraft, although the invention is not limited to any particular breakdown of the cabin. In a preferred embodiment, the name of the different sections 302, 304 available for selection are displayed on the LOPA graphical element above the selectable section. Data controlling the look and feel and content of the LOPA graphical element 300, including but not limited to the sections and the section name, is contained in the screen configuration data 116 for the displayed screen and is modifiable. Depending on the screen displayed, the user may select the entire LOPA graphical element 300 by selecting the "all classes" option (B106) or may select a portion of the cabin by selecting one or more of the sections 302, 304 shown on the LOPA graphical element. In an alternative embodiment, when used on an aircraft with several decks, for example a main deck and an upper deck, the deck will be labeled on the screen and selectable. The deck labels are configurable in the screen configuration data 116.

When a section(s) of the LOPA is selected, the crew user interface 102 will display a visual indicator of the selection. In an embodiment, an indicator (a bold line) is placed around the outline of the selection section. Other types of visual feedback may be provided to the user to indicate the selected section. If the user selects another section, prior to starting a service for the previously selected area or viewing the status of the area, an indicator will be placed around both selected areas and the function selected by the user will be for both selected areas.

Figure 8:
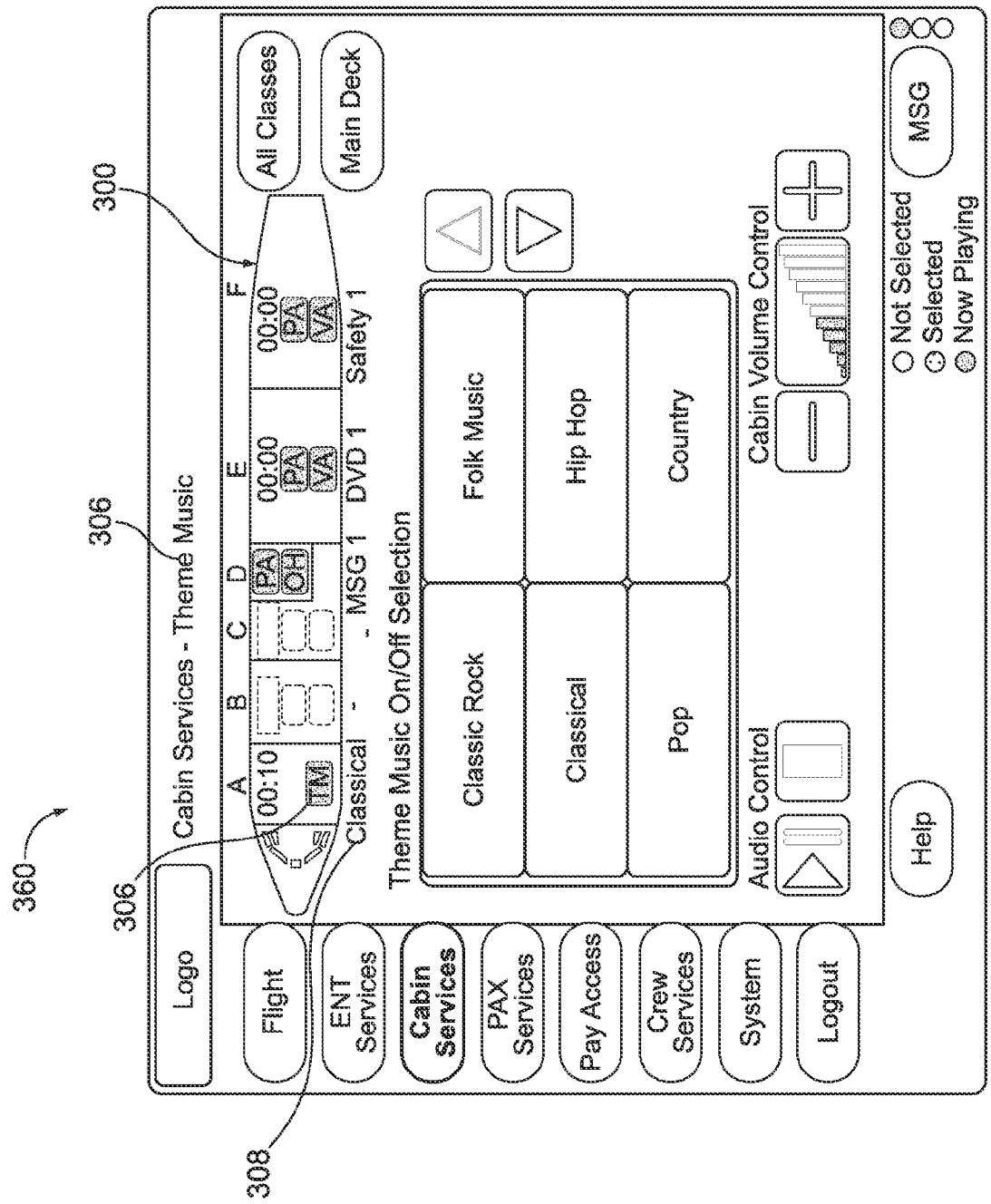
FIG. 8 is an exemplary screen shot according to one embodiment of a crew user interface graphic.

When the LOPA graphical element is used on a screen related to Cabin Services 226 the LOPA graphical element 300 may display status information about the various services available. For example, icons on the selectable areas of the LOPA graphical element 300 may indicate that services including, but not limited to, the following are already in progress: public announcement, video announcement, theme music or video override. In some embodiments the elapsed time for services in progress may also be displayed as well as other information about the services. For example, as illustrated in FIG. 8, if the LOPA graphical element 300 indicates that a service 306, theme music, is in progress, it may also indicate that the type 308 of service is "classical" and the amount of time that it has been in progress. The LOPA graphical element 300 may also indicate other services (e.g. public announcement, video announcement, video override etc.) that are also in progress and the elapsed time. When the LOPA graphical element 300 is used on screens related to Pay Access 230, System 232 or Passenger Services 228, each defined area of the LOPA may contain status indicators that identify the status information related to the passengers or seats in the selected section and indicators that summarize the status information for the aircraft or the selected section of the aircraft. The icons that summarize the status information provide the crew with a quick assessment of the types of services and quantity of those services requested and the section of the aircraft in which they are requested. For example on FIG. 3, an embodiment of a screen related to the Pay Access 230 selection is illustrated. On the LOPA graphical element 300, there are icons 310 in the shape of squares that identify the status of the passenger or seats in that area. Other related icons 312 shown on the screen provide a summary of the cabin status totals for the entire selected section. For example, in the selected portion of the LOPA graphical element, Economy 304, there is a total of five seats that have paid for "Games 1," four seats that have paid for "ENT 1," eight seats that have "ENT 2" and six seats that have "Intranet" service. In other embodiments, icon shapes other than squares or ovals may be used. In the preferred embodiment, the screen contains a legend that identifies the meaning of acronyms and color definitions of any indicators used.

Figure 4:
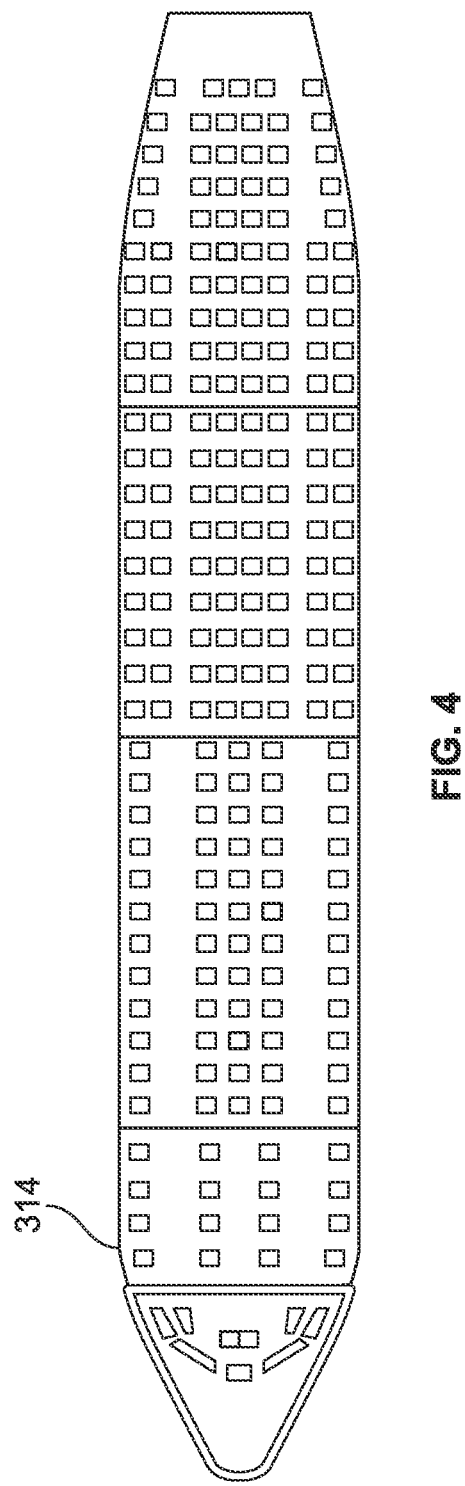
FIG. 4 is an exemplary screen shot according to an example of one embodiment of the maintenance LOPA graphical element

The LOPA graphical element for some screens related to, e.g., power management may be more detailed than the LOPA graphical element used with other screens. FIG. 4 illustrates such a detailed maintenance LOPA graphical element 314 that has icons representative of individual seats. The maintenance LOPA 314 is also selectable by defined areas or sections. In an embodiment, seats experiencing a problem on the aircraft may be identified on the maintenance LOPA in a different color than other seats. This is very helpful in aiding the crew in quickly spotting problems. For example, a seat in which the display needs to be reset may appear as the color red. Seats experiencing various communication problems may appear as blue and seats experiencing power loss may appear as yet another color. The colors used for identifying seat problems are defined in the screen configuration data and may be changed. In an embodiment, user may select a section of the maintenance LOPA for more information and the seat detail provided by the seat display element discussed below.

On various screens, the LOPA graphical element 300 may be used in conjunction with a seat display element 316 to provide more detailed status information. The seat display element 316 allows the crew to easily identify the status of a seat in a section selected on the LOPA graphical element 300. The number of seats viewed on the screen is based upon the section of the aircraft selected on a LOPA graphical element 300. As seen in the embodiment shown in FIG. 3, the seat display element 316 displays the seats in a configuration similar to how they are arranged in the aircraft. Each seat 318 is identified with its seat identifier 320 (row and column) per the aircraft configuration. The aisle markers 322 are placed in the correct columns. In the embodiment shown in FIG. 3, the aisle marker 322 arrows are black when there are more seats in the direction of the arrow and grayed out if not.

The type of status displayed for each seat may change depending upon the screen that the seat display element 316 is displayed on. Status is conveyed to the viewer by the indicator displayed on each seat. For example, in FIG. 3, the indicator 324 is a square. The color and even the shape of the indicator 324 can change to convey different status. In a preferred embodiment, the seat display element 316 may accommodate up to eight status indicators per seat. In other embodiments, a different number of indicators may be used. In some cases the status may be conveyed by the color of the seat 318 itself (for example, a seat that is in communication with the IFE system 110 may be the color green, whereas a non-communicating seat may be colored white). If more than eight status indicators are needed, the seat may show the first four indicators on the first "row" and an arrow to indicate that more exist on a second row.

For example, on the seat display element 316, the different colors of the indicator may refer to the different line replaceable units (LRU)s which are not communicating to the IFE system 110. Whereas on a screen related to Pay Access 230, such as that in FIG. 3, the indicator may refer instead to the different types of entertainment packages available in a particular seat. To aide crew members in easily distinguishing screens, the indicators may be different shapes for different applications. The indicator shapes and colors are configurable in the screen configuration data 116.

Each seat in the seat display element 316 may be selectable. Some embodiments may allow the user to select one seat at a time or multiple seats. An indicator is provided to show that a seat(s) is selected. For example, in FIG. 3, once selected, the outline of the seat is displayed as bolded 326. The outline color is configurable in the screen configuration database 116. If more than one seat is selected, each of those seats may have an outline of the same color around it. In an embodiment, when entering a screen with the seat display element 316 displayed, the focus may be around all of the seats in the selected area. Once a seat is selected, the focus may be around the selected seat. To reset the focus on all of the seats, the individual seats may be deselected. The data controlling the look and feel of the seat control element and layout of the seat control element is specified and contained in screen configuration data 116.

Some screens may have a seat details 328 selection in the function area 204 (FIG. 3). When chosen, this section will display more information about the status of a seat(s). For example when the seat details section is selected on a screen similar to that illustrated in FIG. 3, a screen similar to that illustrated in FIG. 5 may appear.

Figure 5:
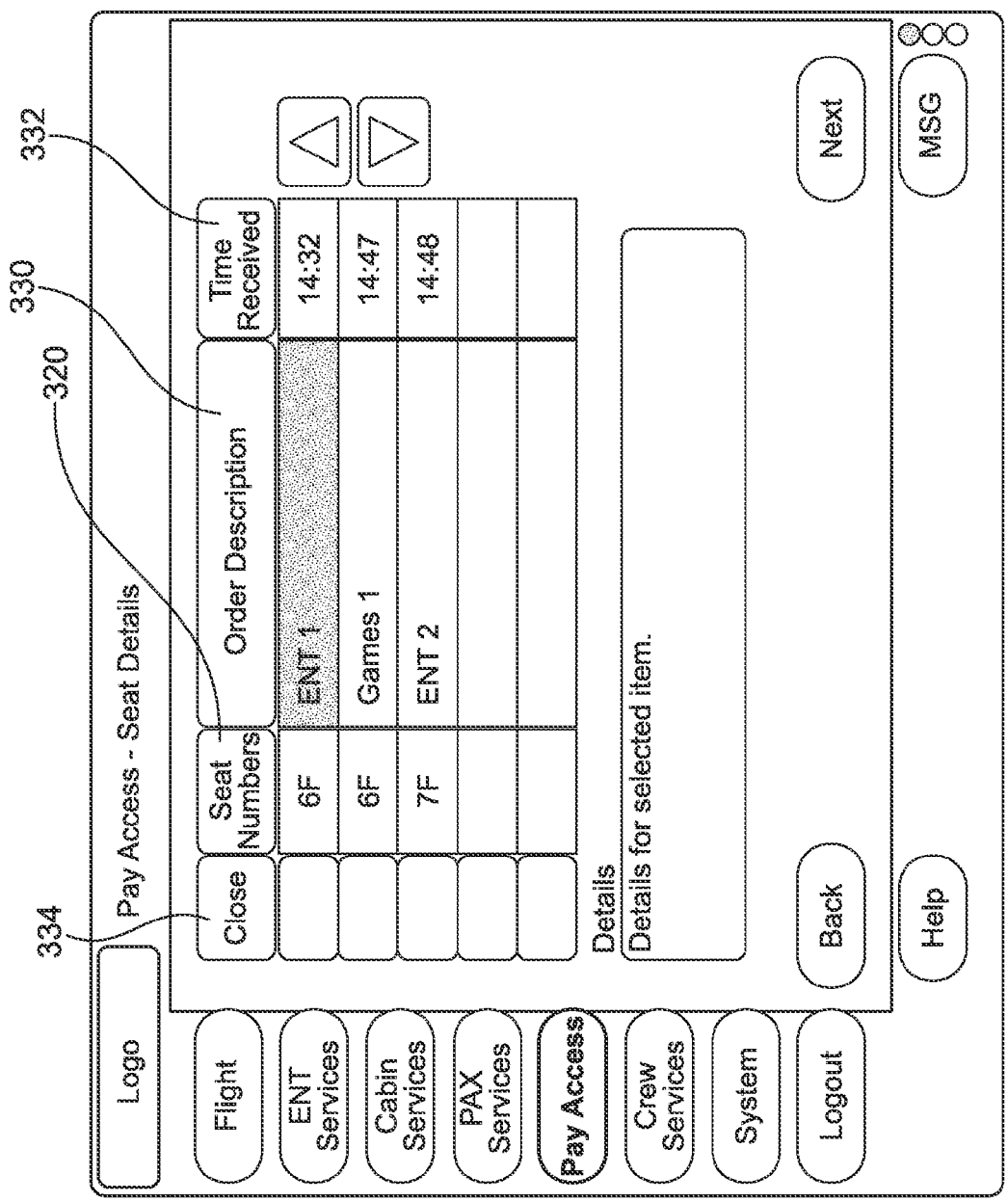
FIG. 5 is an exemplary screen shot according to one embodiment of a crew user interface graphic.

FIG. 5 is a screen shot that provides additional information on the seats selected on the seat display element 316 (FIG. 3). In the context of the seat details screen related to a Pay Access screen, the seat details may include information such as the seat identification 320, the order description 330, the time the order was received 332 and the status 334 of the order (closed or open). Additional information may also be displayed.

Various additional menu selections as indicated in the menu shown in FIG. 2 will now be discussed. Selection of Flight 222 in the navigation area 210 provides flight related information such as the flight number, tail number, origin and destination. Information may be updated using the input 112 of the crew user interface 102. Information updated on the screen will also be updated in the screen configuration data 116.

Selection of Entertainment Services 224 in the navigation area 210 provides the user with the ability to enable or disable, through the input 112 of the crew user interface 102, the delivery of entertainment services, as defined in the screen configuration data 116, to passengers. Types of entertainment services may be audio, video, camera access, telephone, Internet, map access, etc.

Figure 6:
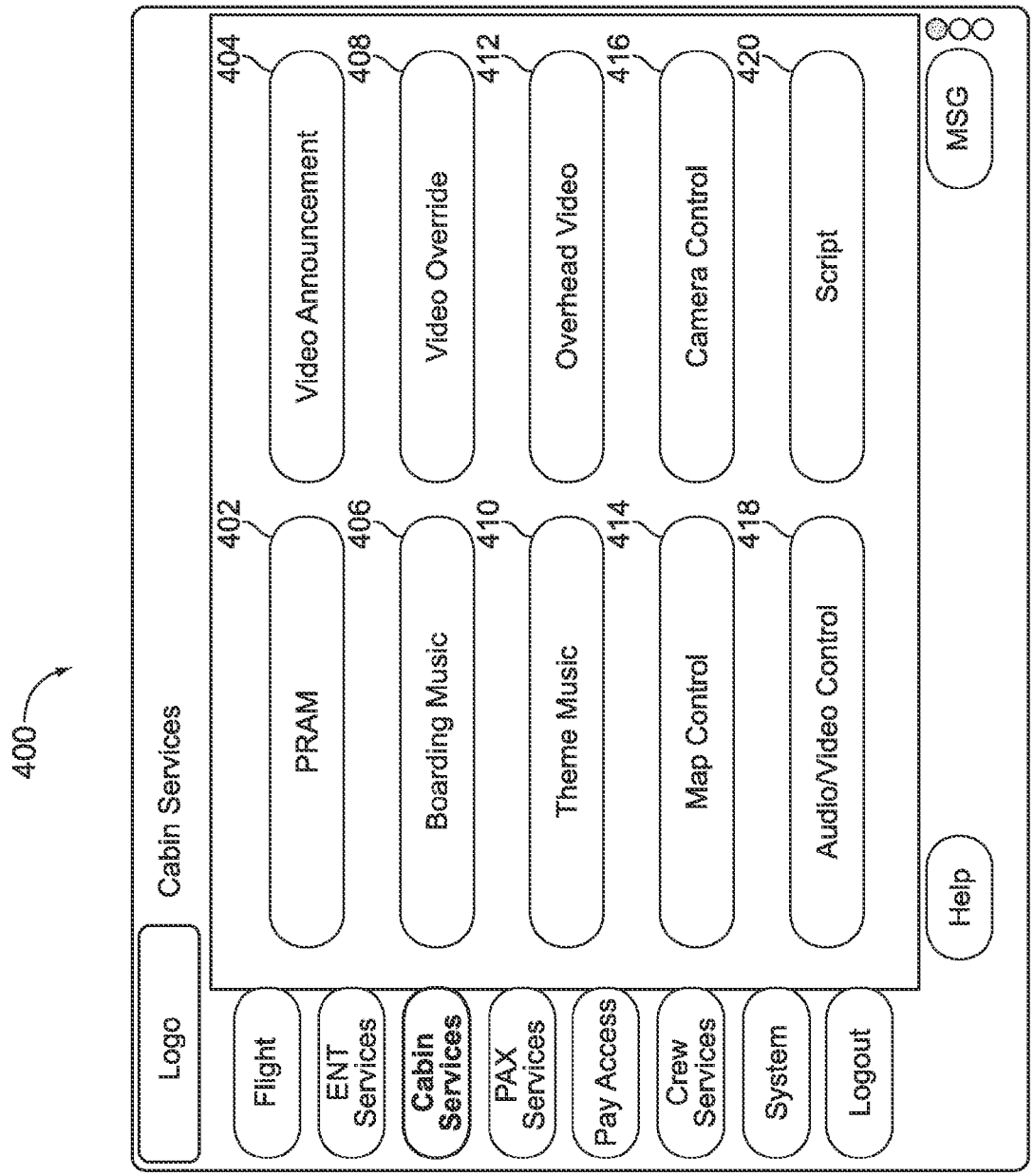
FIG. 6 is an exemplary screen shot according to one embodiment of a menu displayed on the crew user interface.

Selection of the Cabin Services 226 in the navigation area 210 provides a menu of cabin service functions configured for the aircraft. FIG. 6 illustrates cabin services such as those shown in on the cabin services menu 400: Pre-recorded Announcements and Music (PRAM) 402, Video Announcement 404, Boarding Music 406, Video Override 408, Theme Music 410, Overhead Video 412, Map Control 414, Camera Control 416, Audio/Video Control 418, and Script 420. The control screens for these services are reached via selection from the cabin services menu 400. The choices of cabin services available for the aircraft are defined in the Screen Configuration Data 116. For illustrative purposes, some of these services will be now described. The list of services provided is not limiting and may include other types of services.

The IFE System 110 is capable of storing and playing audio messages known as Pre-Recorded Announcements (PRAMs) through the aircraft cabin speakers. PRAMs can be selected and controlled via the crew user interface 102. A PRAM screen is displayed on the crew user interface 102 when PRAM 402 is selected from the Cabin Services Menu 400. The PRAM screen allows selection of PRAM messages to be played. The PRAM screen may include a cabin volume control that sets the volume of playback. Multiple PRAM messages may be selected at one time on the screen. The order in which they are selected is the order in which they are played. When a PRAM is activated, pauseable services may be paused for the PRAM playback.

A Video Announcement is a high-priority source, such as a safety video, displayed on the overhead monitors and the in-seat displays of the aircraft cabin. The audio is available through the cabin speakers and is distributed in the in-seat headsets as an audio public announcement. A Video Announcement overrides any entertainment going on in the aircraft or a selected section of the aircraft. The video announcement screen is displayed when Video Announcement 404 is selected in the Cabin Services Menu 400. The video announcement screen allows the user to select the entire aircraft or a section(s) of the aircraft for viewing and broadcast via the LOPA graphical element 300, the desired language and the Video Announcement source/title. The LOPA graphical element 300 provides visual display for current play status the current status of other services. A view window included in the display on the crew user interface 102 displays the video sources selected. The video sources may be stored in memory.

The IFE system 110 has the capability to play boarding music through the aircraft cabin speakers. The source audio is stored on the IFE system 110 and can be selected and controlled via the crew user interface 102. A boarding music screen is displayed when the Boarding Music 406 element is selected from the Cabin Services Menu 400. The boarding music screen allows the user to select from a set of music categories defined in the screen configuration data 116. In the preferred embodiment, the user can select among the available categories, one category at a time. In an embodiment, if the user selects another category the first will become deselected and the new one "selected." In an embodiment, when a category is selected it is highlighted with a color as defined in the screen configuration data 116. Up/down arrows may be displayed if the number of categories exceeds what can be displayed at one time. The up arrow may be grayed out if the user is at the top of the list and the bottom arrow is grayed out when the user is at the bottom of the list. A scroll action may move the up/down arrow one row at a time. The boarding music screen provides the user with the ability to play, pause or stop the playback of boarding music for the aircraft or a portion of the aircraft and the ability to control the volume of the boarding music playback. To indicate a current selection, a "play" button and the selected boarding music category may be highlighted in a color as defined in the screen configuration data 116.

A Video Override is when a video source selection is forced to be displayed on the overhead monitors and the in-seat displays. The audio is available at the in-seat headsets. This mode allows passengers to select their own audio channel. The video override screen is displayed when Video Override 408 is selected in the Cabin Services Menu 400.

Figure 7:
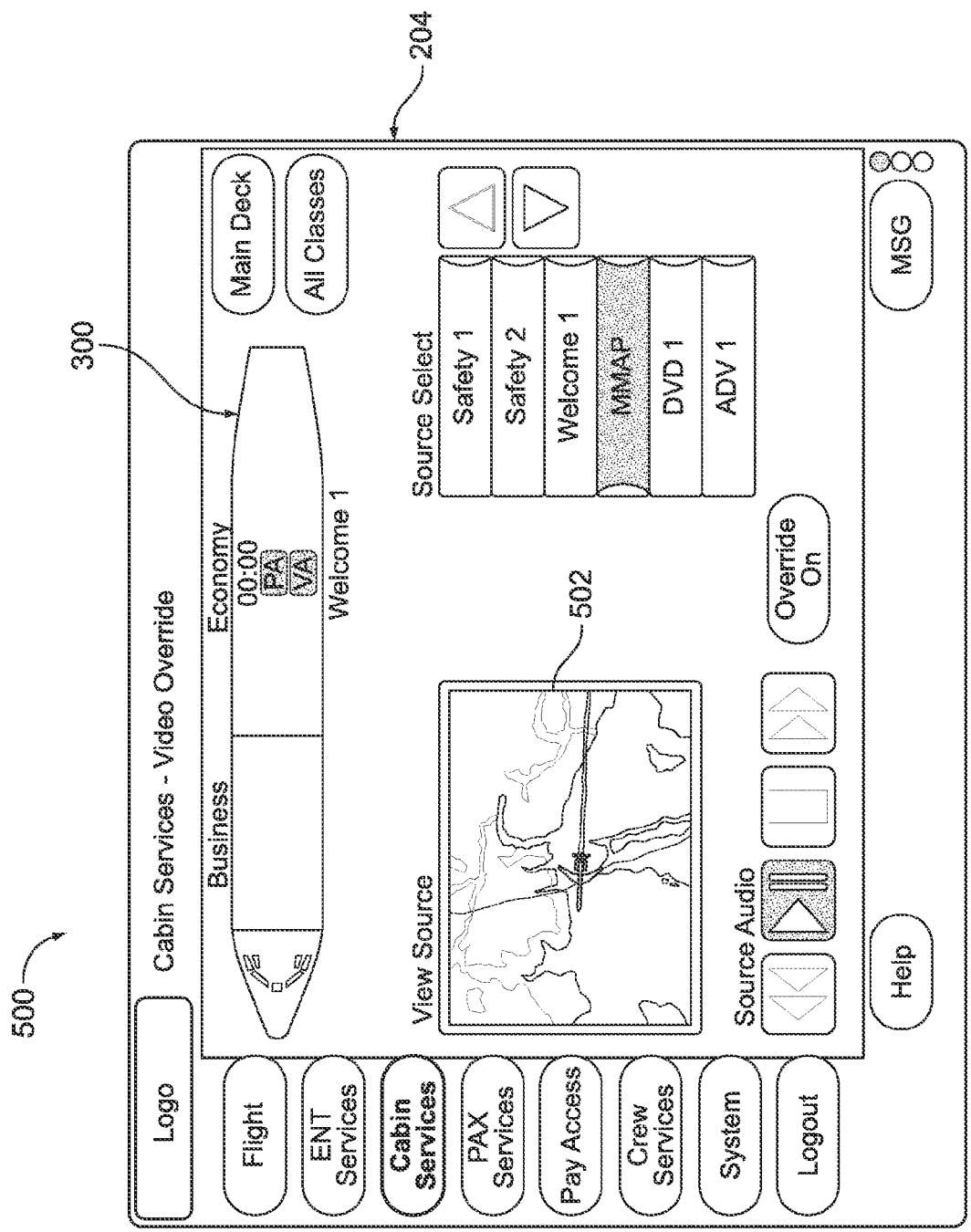
FIG. 7 is an exemplary screen shot according to one embodiment of a crew user interface graphic.

FIG. 7 illustrates an exemplary video override screen 500 that allows the user to select a video for view and broadcast to the seat and overheads in the aircraft or a section of the aircraft as selected on the LOPA graphical element 300. The LOPA graphical element 300 may also provide visual display of the current status of other services in the aircraft or selected section of the aircraft. If a video source is already in progress, the LOPA graphical element 300 will display the elapsed time. A view window 502 in the function area 204 of the video override screen will display the video override source selected to be played. The video override sources may be stored in memory.

FIG. 8 illustrates an exemplary theme music screen that may be displayed when Theme Music 410 element is selected from the Cabin Services Menu 400. As illustrated in FIG. 8, the theme music screen 360 allows the user to select from a set of music categories defined in the Screen Configuration Data 116 and to play or stop the theme music for the aircraft or a portion or the aircraft using the LOPA graphical element. In an embodiment, the user can select one category at a time. If the user selects another category the first will become deselected and the new one "selected." Scroll up/down arrows may be displayed if the number of categories exceeds what can be displayed at one time. The up arrow can be grayed out if the user is at the top of the list and the bottom arrow can be grayed out when the user is at the bottom of the list. The scroll can move up/down one row at a time. When a category of theme music is selected to be played, the selected item will be played and a play button and the selected category may be highlighted with a color defined in the screen configuration data 116. The volume of the theme music selected may be controlled from the theme music screen 504.

The overhead video screen is displayed when the Overhead Video element 412 is selected in the Cabin Services Menu 400. The overhead video screen allows the user to select a video source for view and broadcast to the aircraft or a section of the aircraft using the LOPA graphical element. The LOPA graphical element provides a visual display for status of the video including, but not limited to, the elapsed time and the video name. The LOPA may also display the current status of other passenger services in progress in the aircraft or selected section of the aircraft. A view window in the function area will display the video selected to be played.

Figure 12:
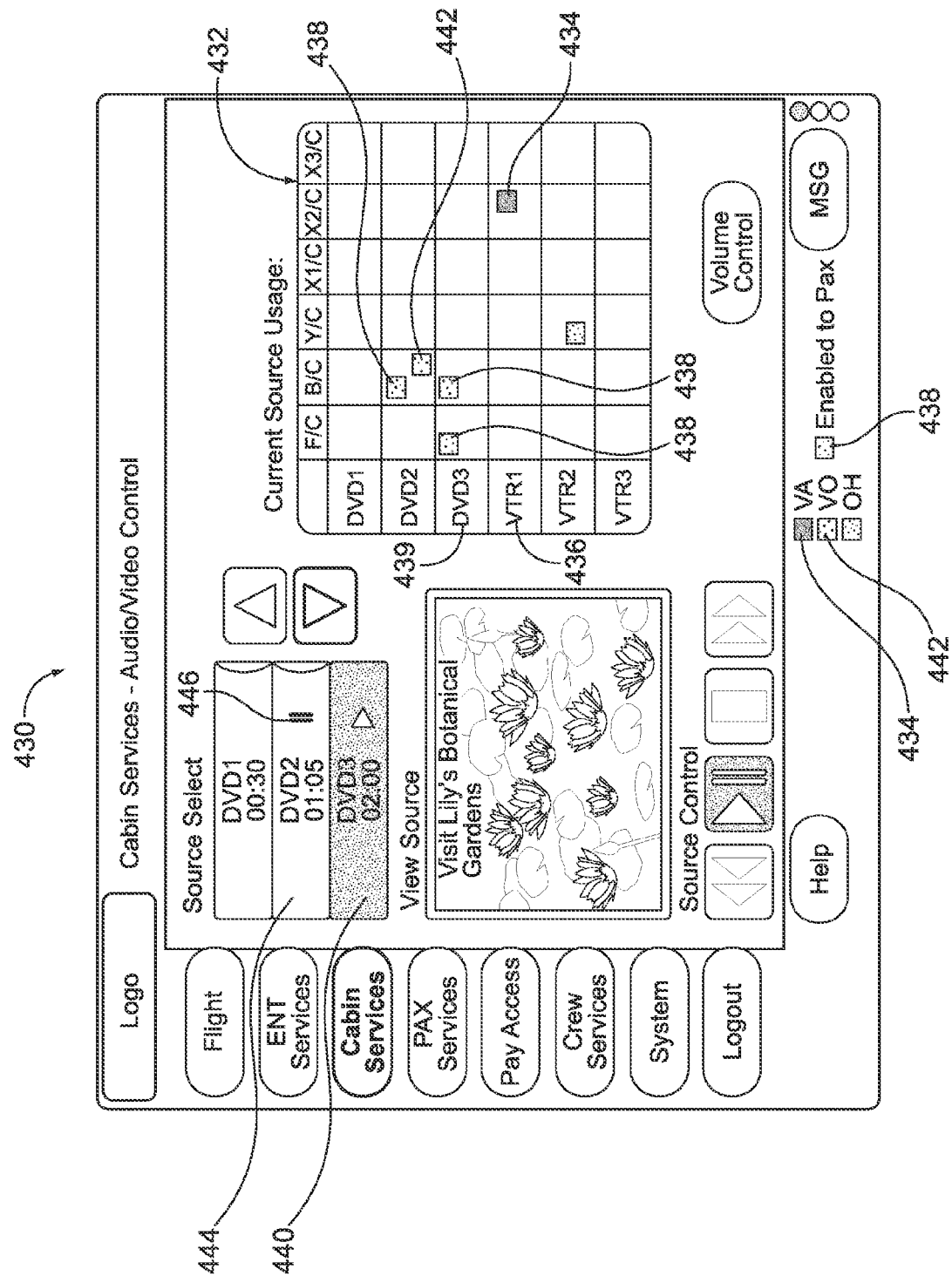
FIG. 12 is an exemplary screen shot according to one embodiment of a graphic on the crew user interface.

FIG. 12 illustrates an exemplary audio/video control screen 430 that may be displayed when the Audio/Video Control element 418 is selected from the Cabin Services Menu 400. In an embodiment, the audio/video control screen 430 allows the crew to view the status of and control DVDs or other external audio and video players. In another embodiment, the audio/video control screen 430 may allow the crew to view the status of and control internal sources that may be used in broadcast services (e.g. video broadcasts on channels that passengers may chose to tune to, video overhead broadcasts that are displayed on the overhead video displays, video overrides that are displayed on both the overhead video displays and the in-seat passenger video displays etc.). As illustrated by the exemplary embodiment in FIG. 12, this screen provides information related to the current status of audio/video and the section of the aircraft for which the audio/video is enabled/in use. FIG. 12 illustrates an exemplary device-in-use graphical element 432. Placement of color or shape coded icons in the device-in-use graphical element 432 identifies the audio/video in use and the section of the aircraft for which it is enabled/in use. For example placement of the video announcement (VA) icon 434 in the device-in-use graphical element (432), identifies that a VA is being played on a device, VTR1 436, in a defined section, the X2/C section in this example, of the aircraft. The placement of the Enabled to PAX icon 438 identifies that DVD3 439 is enabled to passengers in the defined F/C and B/C sections of the aircraft. A source select graphical element 440 for DVD3 439 indicates, by color or other indicator, that DVD3 439 is currently playing and indicates the elapsed play time for DVD3 439. The placement of the Enabled to PAX icon 438 and another icon representing a video/audio service, for example the video override (VO) icon 442, together in the intersection of the DVD2 row and the B/C column in the device-in-use graphical element (432) may be used to identify that a device, DVD2 in this case, is enabled to a section of the aircraft, the B/C section, but another audio/video service, in this example video override, is currently playing. Correspondingly, the source select graphical element for the device DVD2 444 may contain an indicator 446 identifying that the device DVD2 is not currently playing.

Figure 13:
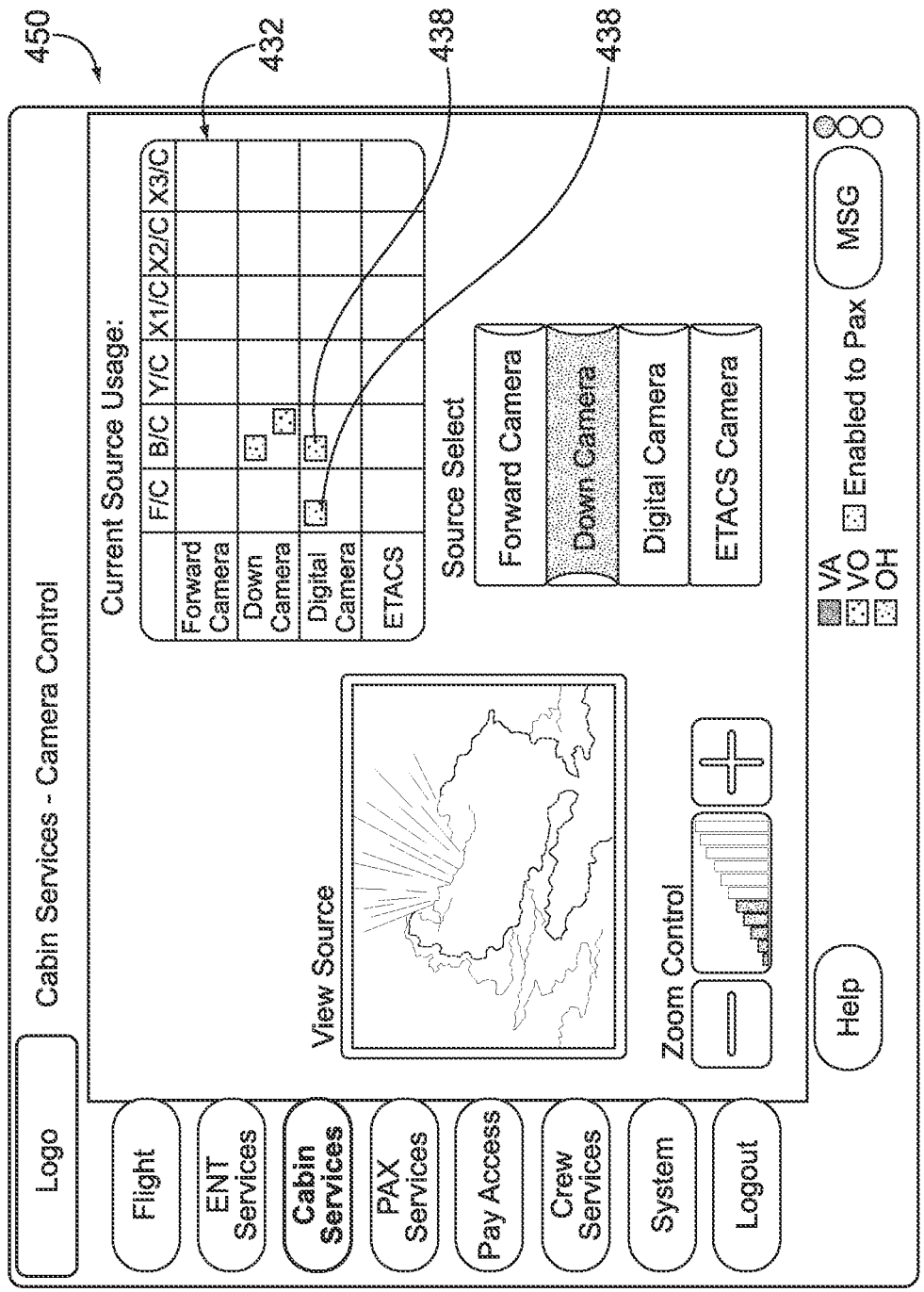
FIG. 13 is an exemplary screen shot according to one embodiment of a graphic on the crew user interface.

A similar device-in-use graphical element may be used on other screens as well. FIG. 13 illustrates an exemplary camera control screen 450 that may be displayed when the Camera Control element 416 is selected from the Cabin Services Menu 400. FIG. 13 illustrates another embodiment of a device-in-use graphical element 432 used on a screen that displays information on an external camera(s). Such a device-in-use graphical element may show for which sections of the aircraft viewing of the camera(s) is enabled and for which camera(s). For example, in the embodiment in FIG. 13, the placement of the Enabled to PAX icon 438 in the device-in-use graphical element 432 identifies that a digital camera is enabled for use to passengers in the F/C and B/C sections of the aircraft. The embodiment may also include a view window that enables a user to see the view of the camera and to control the view provided by the camera, including the ability to zoom the camera view.

The status and control of other cabin services may also be accomplished by selecting menu options from the Cabin Services Menu. The above discussion is not intended to be an exhaustive list of services available, but instead an illustrative list of the type of functionality provided by the crew user interface 102 related to cabin services.

Figure 9:
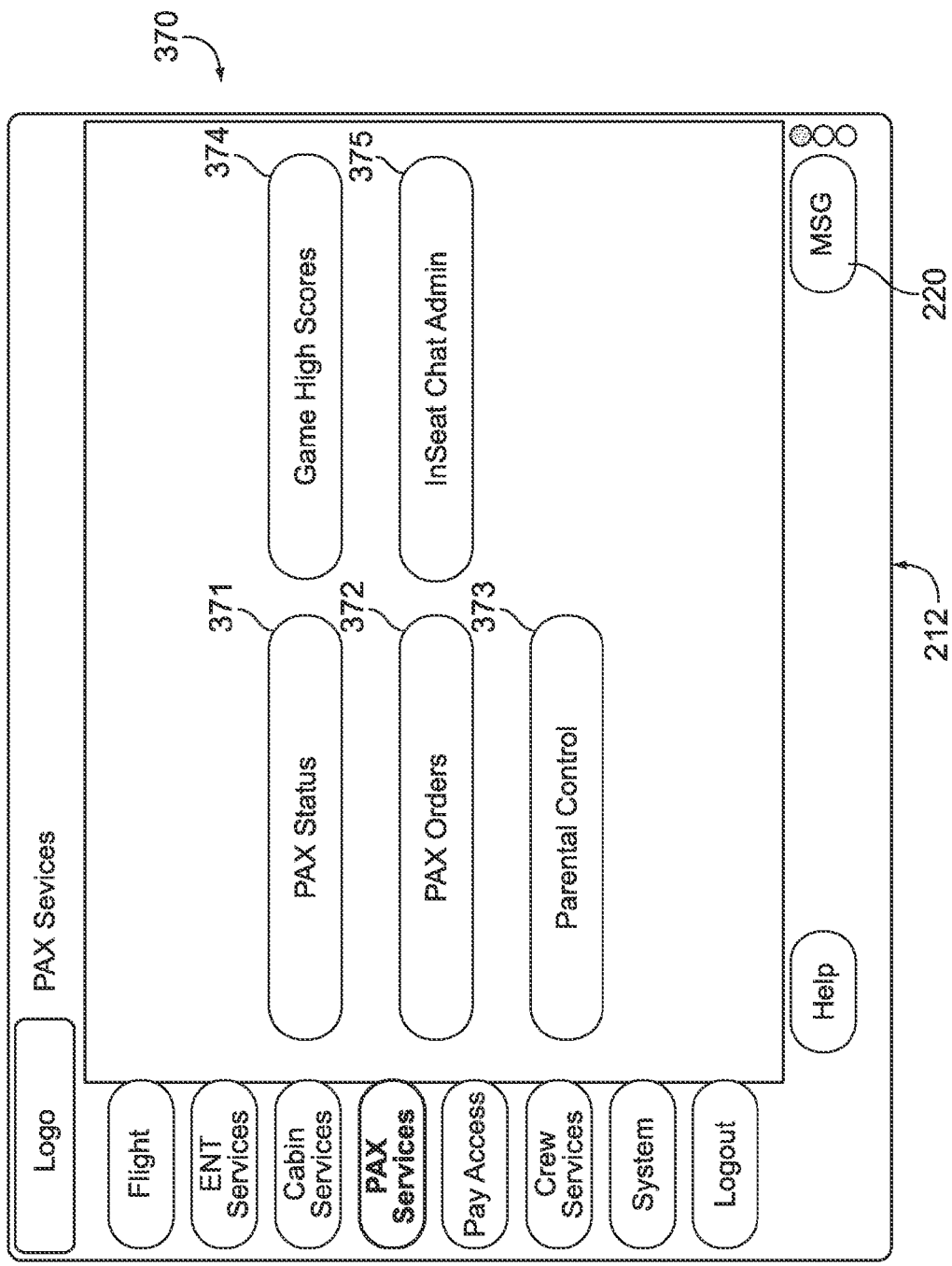
FIG. 9 is an exemplary screen shot according to one embodiment of a menu displayed on the crew user interface.

FIG. 9 illustrates an exemplary screen that may be displayed as a result of selecting the Passenger Services 228 (FIG. 2) in the navigation area 210 provides a menu of passenger service functions configured for the aircraft. Such passenger service functions may include, but are not limited to, services such as those shown on the passenger services menu 370 illustrated in FIG. 9: Passenger Status 371, Passenger Orders 372, Parental Control 373, Games High Scores 374, and In-Seat Chat Administration 375.

Upon selection of the MSG element 220 from the footer area 212 of a screen (for example, the screen illustrated in FIG. 9), the cabin user interface 102 displays a listing of the requested passenger services, the time each request was received, the status of each request (open/closed) and, for open requests, the elapsed time since the request was received or for closed requests, the elapsed time between the time the request was received and the time the request was marked as closed. The items in the list are marked as closed when the status is closed in the passenger status screen (discussed below) or other applicable application screen. A log of all status requests received for the current flight is kept and may be cleared at the close of the flight.

A passenger status screen is displayed when Passenger Status 371 is selected on the passenger Services Menu 370

(FIG. 9). The passenger status screen allows the crew to see the status of a type of request/order or all requests and orders that have been placed by passengers for various passenger services including services such as meal and beverage orders, chat room messages, crew/passenger messaging, duty free shopping, etc. The screen provides the functionality to allow the user to quickly assess how many passengers have each type of request and the seat location of the requests. In an embodiment, a user is able to select on the LOPA graphical element an area for which to view status—the entire aircraft or a section of the aircraft. Utilizing the seat display element, the user may also see the status for a row or a seat.

Figure 10:
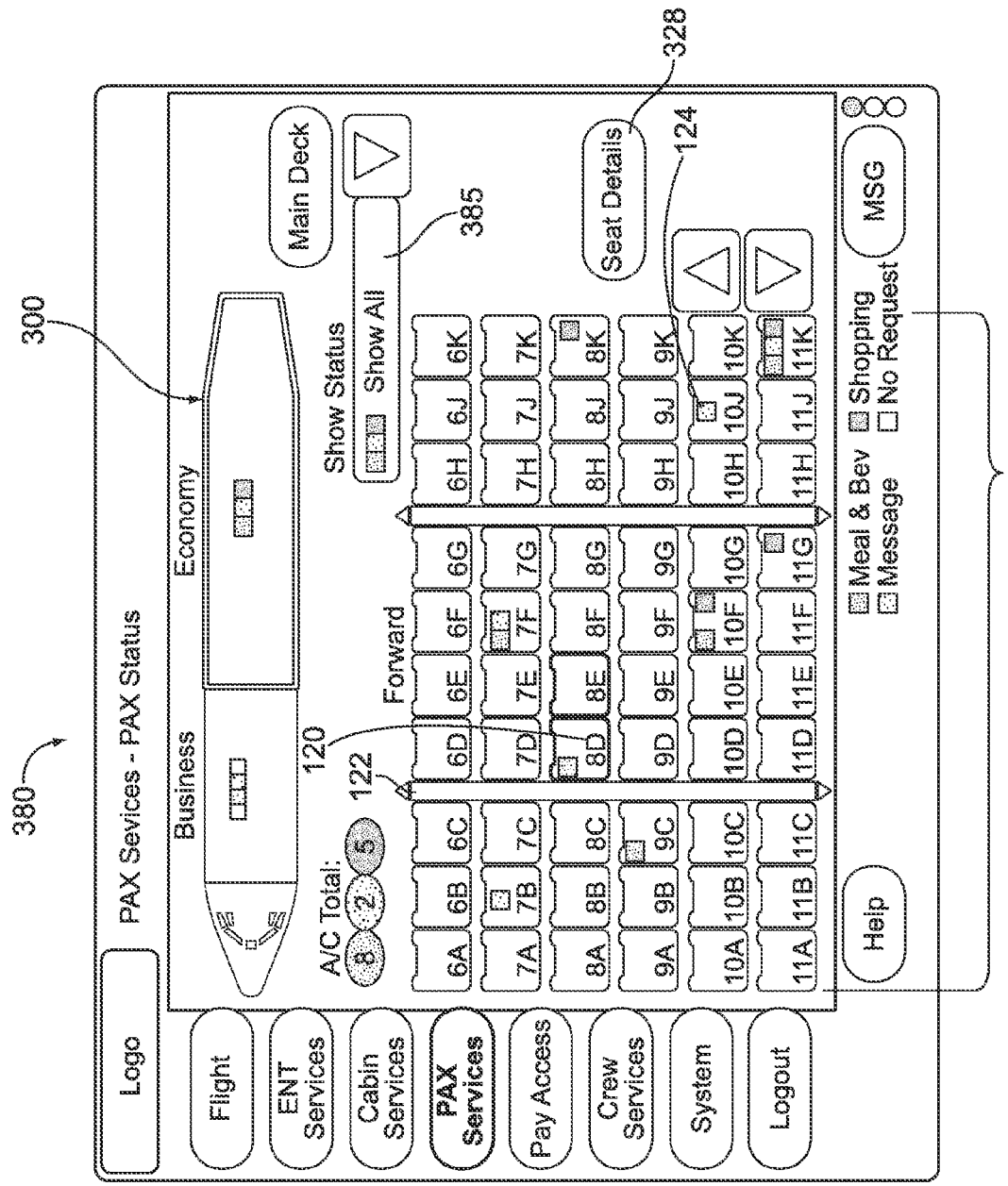
FIG. 10 is an exemplary screen shot according to one embodiment of a graphic on the crew user interface.

An embodiment of the passenger status screen 380 is illustrated in FIG. 10. On this screen, using the LOPA graphical element 300, the user can select the section of the aircraft in which to view individual seats status. By selecting the desired passenger service application category 385, the crew can view the status specific to a selected category of applications (for example, meal and beverage, duty free shopping etc.). As illustrated in FIG. 10, a "Show All" service application category 385 may be provided to enable viewing of the status of multiple categories of passenger service applications. If a user further wishes to explore the details of the status for a specified seat(s), the seat(s) may be selected. Selecting seat details 328 provides a detailed list of the status of the selected seats and allows the user to close one or multiple items for the specified seat number(s). The seat details may be refreshed automatically. When an item (a meal and beverage order, a shopping order, etc.) is closed by the user on either this screen or another appropriate application screen, a checkmark is placed next to the item in the list.

A passenger orders screen is displayed when Passenger Orders 372 is selected on the Passenger Services Menu 370. By using the LOPA graphical element 300, the user may select the portion of the aircraft for which to view the orders. The user has the ability to print this list and take it with them to fill orders. The display of order status information may include order information such as the seat number, the time the order was received, item number, quantity, description of the order and the status of the order. The status of the order may include information such as whether the order is open or closed, paid or unpaid, or out of stock. When an order is confirmed at the seat, the order is sent to the crew and is displayed on the passenger orders screen. The status of the order appears as "open" until the order has been filled and a user closes out the order on the crew user interface 102. The order may be closed on the passenger orders screen or a related screen in the menu hierarchy by selecting the order and then selecting "close" in the status field. Changing the status of the order on such a screen also updates the order in other status screens. A user may also view orders for a selected seat by using the seat details selection. In addition, screens related to the passenger orders screen also allow the user of a crew user interface 102 to add items to a passenger order, remove items from a passenger order, accept payment for items, process refunds for items or check the inventory for an item. Payments may be processed for credit cards or any other accepted payment methods.

Figure 11:
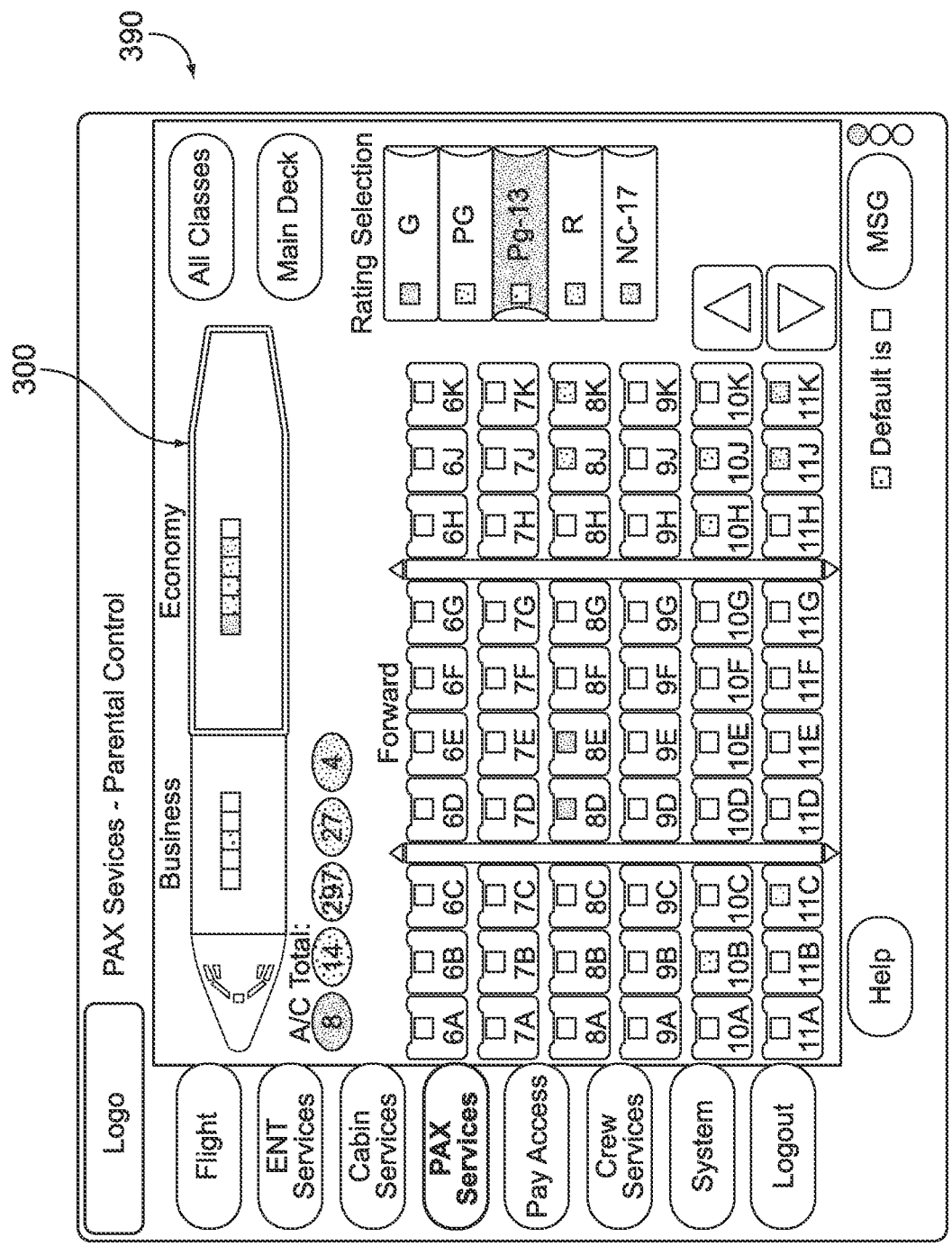
FIG. 11 is an exemplary screen shot according to one embodiment of a graphic on the crew user interface.

FIG. 11 illustrates an exemplary parental control screen 390 that may be displayed when Parental Control 373 is selected from the Passenger Services Menu 370. As illustrated in FIG. 11, the parental control screen 390 provides status information on restrictions over services enabled for or provided to seats. Using the LOPA graphical element 300 and seat details, a user can see what restrictions/filters have been set for services provided to a seat. The types of restrictions/filters may be restrictions on the movies to be made available to a seat, restrictions on internet access or restrictions on other services. For example, a particular seat may be designated as only receiving movies rated "G." Using the seat details element, filters/restrictions on services may be added or removed by a user of the crew user interface 102 for selected seat(s).

The games high score screen is displayed when Games High Screen 374 is selected on the Passenger Services Menu 370. The games high score screen allows the crew to view high score information for games including, but not limited to, trivia games. This screen allows the crew to select a desired game and display the current high scores list. The games available are configured in the screen configuration data 116.

The passenger services in-seat chat administration screen is displayed when the In-Seat Chat Administration 375 is selected from the Passenger Services Menu 370. This screen allows the crew to open/close chat rooms for passengers, monitor chat rooms by viewing chat room messages and to disable/enable specified seat(s) from being able to use the chat application.

In an embodiment, the pay access screen 350 is displayed when the Pay Access 230 is selected in the navigation area 210 (FIG. 2). The pay access screen 350 (FIG. 3) provides current status for pay-to-use applications such as games, movies, the Internet etc. The pay access screen allows the crew to see which pay access applications are selected for each seat. The pay access screen 350 allows the crew to lock or unlock the pay-to-use functions by seat, multiple seats, or a selected section of the aircraft. Once a pay for-to-use application is selected, payment can be processed using the crew user interface 102. For example, a passenger may use cash, credit card or other compensation provided by the aircraft (voucher etc.) to pay for the use. Refunds may also be processed.

The crew services screen is displayed when the Crew Services 234 (FIG. 2) is selected in the navigation area 210 and provides a menu of crew service functions that may be performed such as data management, messaging and logging functions. The Crew Services functions available for the aircraft are defined in the screen configuration data 116. Theses services may include an offload function that provides the capability for the user to write data stored on the IFE System 110 to a portable data storage device for transport to ground data processing equipment. Examples of offload data include credit card and access usage data. The user may select the offload data type and the specific data of interest as well as the specify the starting and ending dates of archived data stored in the IFE system and selected for download. An upload function may also be provided that transfers content from the ground to the IFE system 110 such as the daily news, safety videos and PRAMs. The services may also include the capability to broadcast prerecorded messages in the aircraft of selected portions of the aircraft.

A messaging screen may also be provided that allows the crew to review passenger messages to the crew from the chat application or other applications defined in the screen configuration data 116. This screen also enables the crew to reply to a passenger message. All messages and responses are saved to a crew/passenger messaging log file for the duration of the flight. This log file allows the crew to view message. The screen may also include a cabin condition log that allows the crew to enter cabin and IFE System issues. By interfacing with a Built-In Test Equipment (BITE) fault detection application, the cabin condition log application enables the crew to confirm BITE faults, if the problem matches a fault detected. The cabin condition log list displays the complete list of faults/log entries for the flight and their status (open/closed).

The screen may also include a screen that allows a user of a crew user interface 102 to send a message through the IFE System 110 to ground. Messages may include message such as those reporting emergency or abnormal conditions, wheel chair requirements upon landing or other types of messages.

The system menu is displayed when System 232 (FIG. 2) is selected from the navigation area 210. The system menu allows the user to select menus related to viewing the status of/controlling functions including, but not limited to, view each seat's current communication status with IFE System 110, resetting hardware (display unit etc.) for a seat, viewing whether a seat has power, the presence of a fault condition, and whether the power is enabled or disabled to the seat.

Logout 236 is selectable from the navigation area 210 and allows the user to close a flight, initiate a screen saver function, and or return to other functionality of the crew user interface 102. Upon selecting the close flight option, the system will close out the flight. Closing out the flight causes the IFE System 110 to turn off entertainment services, retract overheads, and tag end the of flight for credit card data, statistics, and BITE functionality.

The crew user interface 102 relies on a variety of data values and system parameters made available from the aircraft and the IFE system 110. For example, upon detection of an In Flight Entertainment Cabinet Cooling Loss, the IFE system 110 is programmed to automatically shut down for safety reasons. The crew user interface 102 provides a notification of this condition to the cabin crew via an informational message on displayed on the crew user interface 102 that the IFE system 110 will power down.

A method is also provided for displaying a graphic 200 on a display 114 of a crew user interface 102. The method comprises accessing by the crew user interface 102 the server 104 to retrieve the screen configuration data 116 that is stored in the non-volatile memory 108 of the database 106 connected to the server 104 and displaying the graphic 200 on the display 114 according to the screen configuration data 116 retrieved from the non volatile memory 108. The method further includes the steps of receiving changes to the screen configuration data 116 and displaying the graphic 200 according to the modified screen configuration data. The invention further includes the step of displaying a plurality of graphical elements in the function area 204 that represent seats.

The system or systems may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. This media can be read by the computer, stored in the memory, and executed by the processor.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context.

Numerous modifications and adaptations will be readily apparent to those skilled in this art without departing from the spirit and scope of the present invention.

What is claimed is:

1. A method for displaying a graphic on a display of a flight crew user interface positioned in an aircraft, the method comprising:
  accessing, by the flight crew user interface, a server to retrieve screen configuration data associated with status information related to a plurality of services and/or systems of the aircraft, the screen configuration data being stored in a non-volatile memory of a database connected to the server; and displaying the graphic on the display of the flight crew user interface as a layout of passenger accommodations (LOPA) graphical element based on the retrieved screen configuration data without requiring recompilation of source code, the graphic being controlled by the screen configuration data and providing the status information related to the plurality of services and/or systems of the aircraft relative to one of specific seats of the aircraft and at least one cabin of the aircraft, wherein the LOPA graphic includes at least a section of the aircraft, provides status information on a seat level and enables a flight crew member to zoom in on a particular seat such that the particular seat appears visually distinct on the display to obtain detailed information with respect to the status information associated with the particular seat; and wherein the detailed information includes at least information related to one of a public announcement, a video announcement, music and video and is conveyed to the user by one or more icons on the LOPA graphic associated with the particular seat.

2. The method of claim 1, further comprising:
providing the graphic with a frame and a function area.

3. The method of claim 2, further comprising:
displaying a plurality of graphical elements in the frame and the function area.

4. The method of claim 3, further comprising:
providing, as a part of the screen configuration data, data specifying the location in which each graphical element is displayed.

5. The method of claim 3, further comprising:
providing, as a part of the screen configuration data, information specifying at least one of the size, shape and color of each graphical element.

6. The method of claim 3, further comprising:
displaying at least one of the graphical elements in the function area that is a stored multimedia file.

7. The method of claim 3 further comprising the steps of:
receiving changes to the screen configuration data; and
displaying the graphic according to the modified screen configuration data.

8. The method of claim 7, further comprising:
providing, for the screen configuration data, a menu structure for the flight crew user interface and the services available on each menu.

9. The method of claim 7, further comprising:
displaying at least one graphical element in the function area that represents a section of a layout of an aircraft.

10. The method of claim 9, further comprising:
displaying a plurality of graphical elements in the function area that represent seats in the section.

11. A system for displaying a graphic on a flight crew user interface on a display device positioned in an aircraft, the system comprising:
a flight crew user interface comprising an input and an output;
a server, accessed by the flight, crew user interface comprising a display application program that is configured to retrieve screen configuration data associated with status information related to a plurality of services and/or systems of the aircraft, the screen configuration data being stored in a non-volatile memory of a database connected to the server, wherein the output of the flight crew user interface includes the graphic that is produced during run-time by the application program interpreting the screen configuration data without requiring recompilation of source code; and wherein the graphic provides the status information related to the plurality of services and/or systems of the aircraft relative to one of specific seats of the aircraft and at least one cabin of the aircraft as a layout of passenger accommodations (LOPA) graphical element on the display device; and an aircraft entertainment system connected to the flight crew user interface, wherein the LOPA graphic on the display device includes at least a section of the aircraft, provides status information on a seat level and enables a flight crew member to zoom in on a particular seat such that the particular seat appears visually distinct on the display to obtain detailed information with respect to the status information associated with the particular seat; and wherein the detailed information includes at least information related to one of a public announcement, a video announcement, music and video and is conveyed to the user by one or more icons on the LOPA graphic associated with the particular seat.

12. The system of claim 11, wherein the graphic comprises a menu in a menu hierarchy and the screen configuration data comprises data specifying the menu hierarchy and a format of the menu.

13. The system of claim 11, wherein the graphic comprises a plurality of seats and at least one status indicator for at least one of the plurality of seats.

14. The system of claim 11, wherein the output of the crew user interface displays chat room messages.

15. The system of claim 11, wherein the graphic comprises a frame and a function area.

16. The system of claim 15, wherein the function area comprises passenger orders received by the aircraft entertainment system that are displayed.

17. The system of claim 15, wherein both the frame and the function area comprise a plurality of graphical elements that are displayed and at least one graphical element that is selectively activated through the input of the flight crew user interface to cause a service to be delivered by the aircraft entertainment system to an entity selected from the group consisting of a seat, a section, and an entire aircraft.

18. The system of claim 17, wherein the screen configuration data comprises data specifying a size, shape and placement of each graphical element in the frame and the function area.

19. The system of claim 17, wherein the service is playing a video or playing an audio message.

20. The system of claim 15, wherein the frame and function area comprise a plurality of graphical elements that are displayed, and at least one graphical element that is selectively activated through the input of the crew user interface to cause a cause a service to be restricted from being delivered.

21. The method of claim 1, wherein the plurality of services and/or systems of the aircraft comprises at least one of flight information, entertainment services, cabin services PAX services, payment systems, crew services, system information, login information and security information.

22. The method of claim 1, wherein providing the status information related to the plurality of services and/or systems of the aircraft relative to one of specific seats of the aircraft and at least one cabin of the aircraft comprises providing status information related to relevant services and/or systems associated with each seat of the aircraft.

23. The system of claim 11, wherein the plurality of services and/or systems of the aircraft comprises at least one of flight information, entertainment services, cabin services PAX services, payment systems, crew services, system information, login information and security information.

24. The system of claim 11, wherein the graphic provides the status information related to the plurality of services and/or systems of the aircraft relative to one of specific seats of the aircraft and at least one cabin of the aircraft by providing status information related to relevant services and/or systems associated with each seat of the aircraft.

25. The method of claim 1, wherein the icons indicate one or more of a game status of a passenger associated with the particular seat, an entertainment status of the passenger associated with the particular seat, and an intranet status of the passenger associated with the particular seat.

26. The method of claim 1, wherein the detailed information further includes elapsed time related to particular services associated with the passenger.

27. The system of claim 12, wherein the icons indicate one or more of a game status of a passenger associated with the particular seat, an entertainment status of the passenger associated with the particular seat, and an intranet status of the passenger associated with the particular seat.

28. The system of claim 11, wherein the detailed information further includes elapsed time related to particular services associated with the passenger.

* * * * *